United States Patent [19]

LaSota

[11] Patent Number: 5,148,067
[45] Date of Patent: Sep. 15, 1992

[54] LATCHING LINEAR MOTOR

[76] Inventor: Laurence LaSota, 15745 N. Park, East Detroit, Mich. 48021

[21] Appl. No.: 724,595

[22] Filed: Jul. 1, 1991

[51] Int. Cl.$^5$ ............ H02K 41/02; H02K 7/06; H02K 33/02; H02K 35/02
[52] U.S. Cl. .................................. 310/24; 310/14; 310/80
[58] Field of Search ............ 310/78, 23, 24, 20, 310/37, 80, 81, 82, 83, 84, 14, 17, 20, 30, 34

[56] References Cited

U.S. PATENT DOCUMENTS

| | | |
|---|---|---|
| 887,344 | 5/1908 | Nelson. |
| 2,935,663 | 5/1960 | Pollak ............................ 317/190 |
| 3,138,749 | 6/1964 | Stibitz ............................ 310/26 |
| 3,217,218 | 11/1965 | Steele ............................ 310/328 |
| 3,219,854 | 11/1965 | McLaughlin .................. 310/14 |
| 3,248,579 | 4/1966 | Plasko ............................ 310/23 |
| 3,275,964 | 9/1966 | Kumm ............................ 335/259 |
| 3,344,377 | 9/1967 | Clements ........................ 335/259 |
| 3,349,304 | 10/1967 | Wachter ........................ 310/26 |
| 3,430,120 | 2/1969 | Kotaka et al. ................ 318/135 |
| 3,445,688 | 5/1969 | Thorel et al. .................. 310/14 |
| 3,491,319 | 1/1970 | Cox et al. ...................... 335/259 |
| 3,495,147 | 2/1970 | Flora ............................ 318/135 |
| 3,713,059 | 1/1973 | Tada ............................ 335/259 |
| 3,763,412 | 10/1973 | Detrick et al. ................ 318/135 |
| 3,825,160 | 7/1974 | Lichtenberger et al. ...... 226/59 |
| 3,895,281 | 7/1975 | Corbaz ........................ 318/687 |
| 4,242,606 | 12/1980 | Nonnenmann ................ 310/12 |
| 4,327,344 | 4/1982 | Luckenbach .................. 335/253 |
| 4,352,048 | 9/1982 | Schulze ........................ 318/135 |
| 4,358,691 | 11/1982 | Naylor ............................ 310/12 |
| 4,640,811 | 2/1987 | Peletan ........................ 376/228 |
| 4,835,425 | 5/1989 | LaSota .......................... 310/14 |
| 5,013,945 | 5/1991 | Adolfsson .................... 310/26 |

Primary Examiner—Steven L. Stephan
Assistant Examiner—D. R. Haszko
Attorney, Agent, or Firm—Basile and Hanlon

[57] ABSTRACT

A linear motor provides stepwise, incremental advance of a moveable output member. First and second, spaced latches are movably coupled to the output member. A selectively energizible driver engages and moves the first latch into fixed engagement with the output member and continues to move the engaged first latch and output member a predetermined incremental advance distance. The second latch is biased to retain the output member in each successive incremental advance position while the first latch is being reset. In one embodiment, the driver is a solenoid having a movable plunger operably coupled to the first latch. In another embodiment, the drive is a motor having a rotatable output shaft with an eccentric cam mounted thereon. The eccentric cam engages the first latch to move the first latch into fixed engagement with the output member and to advance the fixedly engaged first latch and output member an incremental advance distance. Unlatch members are optionally coupled to at least the second latch for unlatching the second latch to enable the output member to be retracted in a direction opposite from the incremental advance direction.

12 Claims, 5 Drawing Sheets

LATCHING LINEAR MOTOR

BACKGROUND OF THE INVENTION

1. Field of the Invention

The present invention relates, in general, to linear positioning devices.

2. Description of the Relevant Art

Linear positioning devices have been employed to advance a work member an incremental amount upon each repeated energization of the positioning device. Numerous configurations for such linear positioning devices have been devised for different applications and some include a plurality of coils and movable cores for variable, discrete advance of a movable core depending upon the magnitude of the electrical current applied to the coils or the number of coils which are energized. Other incremental positioning devices simply operate in an on/off mode, that is, the movable member moves to one position when the coil is energized and then returns to the start or home position when current is removed from the electrical coil.

As disclosed in U.S. Pat. Nos. 4,835,425 and 5,055,725 issued to the Applicant, a typical linear positioning device utilizes an electrical coil and a magnetic core including at least one movable core member which is attracted to another portion of the core by magnetic flux induced in the core when electric current is applied to the coil. The core and coil extend along the total travel distance of a movable pole member and magnetic plunger which coaxially extend through the core and coil. Opposed faces of the movable pole member and the plunger are separated by an air gap. A biasing spring is connected between the plunger and the pole member to bias the pole member away from the plunger when electrical current is removed from the coil to re-establish the air gap between the pole member and the plunger for the next sequential energization of the coil. Latches act on the pole member and the plunger to provide unidirectional movement of the pole member and the plunger when a magnetic field is induced in the core which causes advance of the plunger into contact with the pole member.

However, it has been found that the linear motor disclosed in the aforementioned patent and pending application is effectively limited to small amounts of total advance of the pole member or output element attached thereto. This is due to the fact that the core and coil are constructed in such a length so as to extend along the total advance distance of the pole member or output element. For long distances, i.e., five to ten feet or more, this arrangement results in a linear motor having a high weight and cost due to the lengthy core and coil.

Further, while these linear motors are effective for small total advance distances and increments, the strength of the magnetic field in such linear motors is not constant over the entire length of the motor and falls off or decreases near the ends of travel due to the geometry of the field and the plunger. This introduces a variation into the strength or pull of the magnetic field over the overall travel distance of the linear motor.

Thus, it would be desirable to provide a linear motor for incrementally advancing a movable output member in a stepwise fashion upon repeated energization of the motor which overcomes the problems associated with previously devised linear motors. It would also be desirable to provide a linear motor which incrementally advances an output member over a long total distance of travel in successive incremental amounts. It would also be desirable to provide a linear motor which provides a constant incremental advance of an output member over the entire length of travel of the output member. Finally, it would be desirable to provide a linear motor which incrementally advances an output element or member and which has a reduced weight and manufacturing cost compared to previously devised linear motors.

SUMMARY OF THE INVENTION

The present invention is a linear motor which provides unidirectional or bidirectional, stepwise, incremental advance of a movable output member in discrete steps.

In the broadest form, the present linear motor includes a movable output member and first and second, spaced, latch means which are coupled to the output member and which respectively latch the output member for one incremental advance and retain the output member in each incremental advanced position. Selectively energizable means are provided for engaging and moving the first latch means into fixed engagement with the output member and for continuing to move the fixedly engaged first latch means and output member a predetermined, incremental, linear distance for each successive energization of the engaging and moving means.

In one embodiment, the engaging and moving means comprises an electromagnetic solenoid having a plunger slidably disposed therein and movable from a first extended position over a predetermined distance to a second position when the plunger is magnetically attracted to the core after electrical current has been applied to the coil of the solenoid. The first and second latch means are co-linearly arranged along the length of the output member. The plunger engages the first latch means as the plunger is magnetically drawn into the core after electrical current has been applied to the coil of the solenoid to move the first latch means into a position in which the first latch means fixedly engages the output member so as to result in an incremental advance of the output member as the plunger completes its travel to the second position. The second latch means retains the output member in the incrementally advanced position as the first latch means is reset after electrical current has been discontinued to the solenoid for the next sequential operation of the solenoid.

The solenoid may be mounted alongside of the output member or co-axially with respect to the output member. In the latter embodiment, the output member slidably extends through the co-axially arranged plunger and core/coil of the solenoid.

Unlatch means may also be provided for unlatching at least the second latch means so as to enable the output member to return from any incremental advance position to a start or home position. The unlatch means may include an arrangement which is self-actuated each time the plunger of the solenoid returns to the first position after electrical current has been discontinued from the solenoid. The unlatch means may be in the form of a linkage associated with and responsive to the plunger for automatically unlatching the second latch means during each movement of the plunger to the first, extended position. Alternately, the unlatch means may employ a separate driver, such as an independent solenoid, which moves an unlatch release member to move or pivot the second latch means to a position allowing retraction of the output member.

In another embodiment, means are provided for varying the incremental advance distance of the solenoid. In this embodiment, an eccentric plunger return stop is coupled to the plunger and establishes the first extended position of the plunger of the solenoid. A separate adjustment solenoid drives an adjustment pawl which engages a ratchet gear mounted on the eccentric plunger return stop. Selective activation of the adjustment solenoid moves the eccentric plunger return stop to the desired position to vary the amount of return travel of the plunger to the first position and, thereby, the amount of subsequent forward travel of the plunger into the core.

The linear motor described in a first embodiment of the present invention may be arranged in co-linear pairs with respect to a single output member. This arrangement provides near continuous advance of the output member by selective and consecutive energizations and de-energizations of the pair of linear motors. Alternately, the pair of linear motors may be arranged in opposed operable positions with respect to the output member and coupled via appropriately arranged first and second latch means to the output member to provide bidirectional incremental movement of the output member.

In yet another embodiment, the engaging and moving means is an electrical motor having a rotary output shaft. A cam is eccentrically mounted on the output shaft and engages the first latch means coupled to the output member to move the first latch means into fixed engagement with the output member during a portion of each cycle of rotation of the output shaft and the eccentric cam and to move the fixedly engaged first latch means and output member forward one incremental advance distance. A second latch means may be coupled to the output member for retaining the output member in the incremental advance position, as described above for the first embodiment of the present invention.

The rotary motor may be combined with a solenoid operated engaging and moving means for particular applications requiring high speed incremental advance via the motor and a slower, finer incremental advance via the solenoid driver.

The various embodiments of the present linear motor provide for incremental advance of an output member in which the linear motor has a simple construction and a low weight despite its potential use providing long total travel distances of the output member. This is due to the positioning of the driver which incrementally advances the output member in a fixed position relative to a long length output member. This arrangement also enables the incremental advance distance of the output member to remain constant over the entire travel distance of the output member. The linear motor of the present invention may be utilized in various combinations, either singly or in pairs and with appropriate latch and unlatch means for unidirectional, bidirectional, self-switching and high speed/low speed arrangements for use in many different applications.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
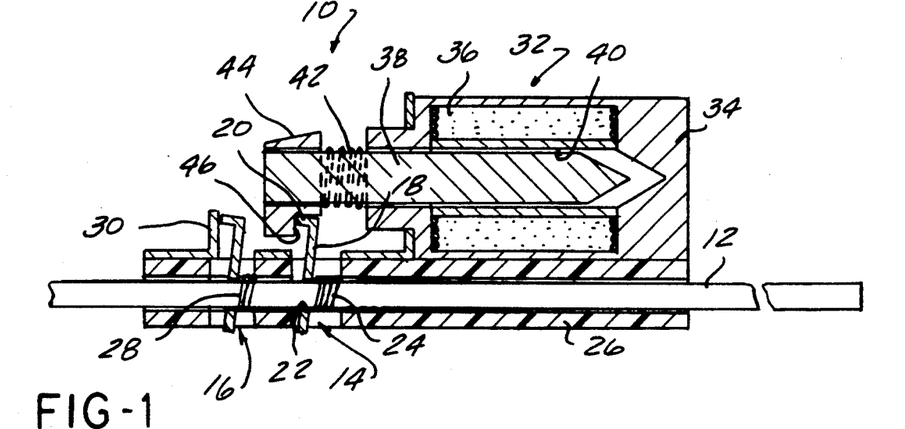
FIG. 1 is a front, cross sectional view of one embodiment of the linear motor of the present invention.
Figure 2:
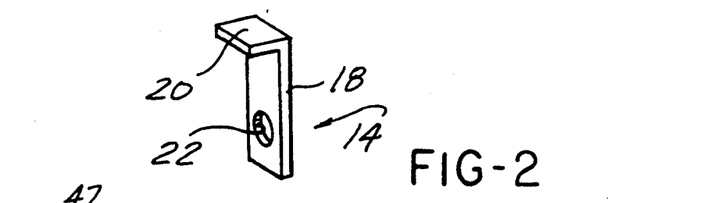
FIG. 2 is a partial, perspective view showing one of the latch means employed in the linear motor depicted in FIG. 1.
Figure 3:
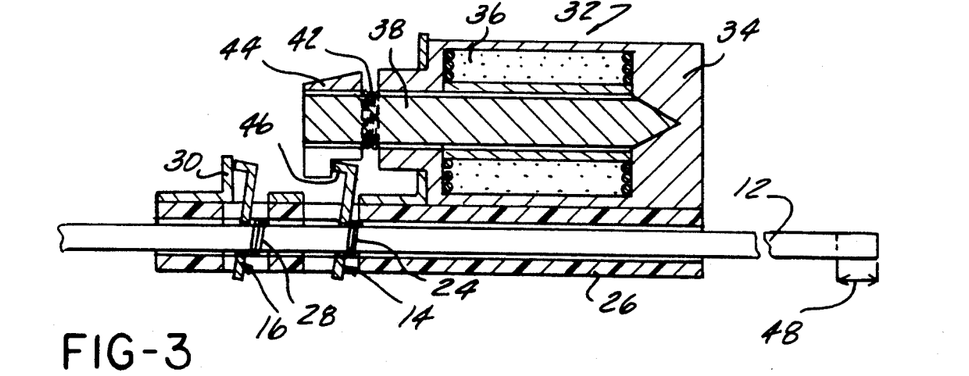
FIG. 3 is a front, cross sectional view, similar to FIG. 1, but showing the position of the plunger, latch means and output member after one incremental advance of the output member has taken place.

Referring now to the drawing, and to FIGS. 1, 2 and 3 in particular, there is illustrated one embodiment of a linear motor constructed according to the teachings of the present invention. As shown therein, a linear motor 10 includes an elongated, movable output member or element 12. The output member 12 may have any shape, such as circular, square, etc., and may be solid or hollow. The output member 12 can also be a flexible cable as described hereafter. Further, the output member 12 may be provided in any length needed for the requirements of a particular application. Thus, the output member 12 may have a length of from several inches to ten feet or more.

The linear motor 10 also includes first and second, spaced latch means, 14 and 16, respectively. Each of the first and second latch means 14 and 16, respectively, may have an identical shape as shown in FIGS. 1 and 2. Thus, the first latch means 14 comprises a generally L-shaped member having an elongated first leg 18 and a second leg 20 which extends substantially perpendicular from one end of the first leg 18. A through bore 22 is formed in the first leg 18 and slidably receives the output member 12 therethrough. In this manner, each of the first and second latch means 14 and 16 is operably coupled to the output member 12.

A biasing means 24, preferably in the form of a coil spring, is disposed about the output member 12 and acts between a housing denoted in general by reference number 26 and described in greater detail hereafter and the first leg portion of the first latch means 14. The biasing means 24 functions to bias the first latch means 14 to a first position in which the output member 12 is freely slidable through the bore 22 in the first latch means 14. The first latch means 14 is also movable, as described hereafter, from the first position to a second position, as shown in FIGS. 1 and 3, in which the solid portions of the first leg portion 18 of the first latch means 14 fixedly engage the peripheral surface of the output member 12 extending through the bore 22 in the first latch means 12 to fixedly engage the first latch means 14 to the output member 12 for simultaneous movement. Similarly, the second latch means 16, which is identically constructed as the first latch means 14, is biased by a biasing means 28, preferably in the form of a coil spring seated between a solid portion of the housing 26 and a first leg of the second latch means 16, to a first position in which the output member 12 is freely slidable therethrough. However, as shown in FIG. 1, the perpendicular second leg 20 of the second latch means 16 engages a latch stop 30 fixedly mounted on the housing 26. The stop 30 in combination with the biasing force of the biasing means 28 pivots the second latch means 16 to a second position in which the second latch means 16 fixedly engages the output member 12. This engagement enables the output member 12 to move only in one direction, such as to the right as shown in FIGS. 1 and 3, but not in the reverse direction or to the left in the orientation shown in FIGS. 1 and 3.

The linear motor 10 also includes a selectively energizable means for engaging and moving the first latch means 14 to the second position into fixed engagement with the output member 12 and for continuing to move the fixedly engaged first latch means 14 and the output member 12, when energized, forward a predetermined incremental advance distance. In one embodiment shown in FIGS. 1 and 3, the engaging and moving means comprises a conventional electromagnetic solenoid 32 formed of a magnetic core 34 which surrounds an electric coil 36. The coil 36 is formed of a plurality of turns or windings of an electrical conductor about a bobbin mounted within the core 34. The core 34 and coil 36 are magnetically coupled such that the passage of electric current through the coil 36 induces a magnetic field in the core 34 which draws a slidable plunger 38 into the magnetic core 34.

As shown in FIG. 1, the plunger 38 is slidably mounted in a bore 40 formed centrally within the magnetic core 34. The plunger 38 is movable from a first extend position shown in FIG. 1, when electric current to the coil 36 of the solenoid 32 is discontinued, to a second position shown in FIG. 3, when electric current is applied to the coil 36 and generates a magnetic field in the core 34 to magnetically attract the plunger 38 to the second position in the core 34 as shown in FIG. 3.

Means are provided for moving the plunger 38 to the first position shown in FIG. 1. In a preferred embodiment, a biasing means 42 is seated between one end of the core 34 and a collar 44 attached to one end of the plunger 38. The biasing means 42 normally biases the plunger 38 outward from the core 34 to the first extended position, as shown in FIG. 1. The biasing force provided by the spring 42 is overcome by the magnetic force generated when electric current flows through the coil 36 of the solenoid 32.

The collar 44 secured to one end of the plunger 38 has a flange portion 46 which engages the second leg 20 of the first latch means 24 when the plunger 38 is in the first position shown in FIG. 1. The flange 46 causes the first latch means 14 to pivot about the output member 12 to the second position in which the first latch means 14 is fixedly engaged with the output member 12.

In operation, with the plunger 38 in the positions shown in FIG. 1, the passage of electric current through the coil 36 will generate a magnetic field in the core 34 which will attract the plunger 38 into the core 34, thereby causing the plunger 38 to move from the first extended position shown in FIG. 1 to the second position shown in FIG. 2. Due to the engagement of the flange 46 on the collar 44 attached to the plunger 38, such movement of the plunger 38 is translated into linear movement of the first latch means 14 which is fixedly engaged with the output member 12. Thus, the first latch means 14 and the output member 12 move forward an incremental advance distance shown by reference number 48 in FIG. 3 which is substantially equal to the distance of travel of the plunger 38 from the first position to the second position.

During such forward, incremental advance movement of the output member 12, the output member 12 freely slides through the second latch means 16. However, due to the orientation of the second latch means 16 which is held in the position shown in FIGS. 1 and 3 by the combined interaction of the biasing means 28 and the stop 30, the second latch means 16 retains the output member 12 in the forward incrementally advanced position and prevents a reverse movement of the output member 12, such as to the left in the orientation shown in FIGS. 1 and 3, when electric current is discontinued to the coil 36 of the solenoid 32.

When electric current is discontinued from the coil 36 of the solenoid 32, the biasing spring 42 urges the plunger 38 to the first extended position. The biasing means 24 associated with the first latch means 14 will move the first latch means 14 to the left, in the orientation shown in FIGS. 1 and 3, until the first latch means 14 reaches its normal position shown in FIG. 1. At this time, the linear motor 10 is in a position for the next sequential energization and incremental advance of the output member 12.

It should be noted that the shape of the housing 26 shown in FIGS. 1 and 3 is depicted by way of example only as the housing 26 may have any suitable shape as required for the needs of a particular application. The housing 26 is preferably formed of a plastic material; although other materials, such as steel, brass, etc., may also be employed.

Figure 4:
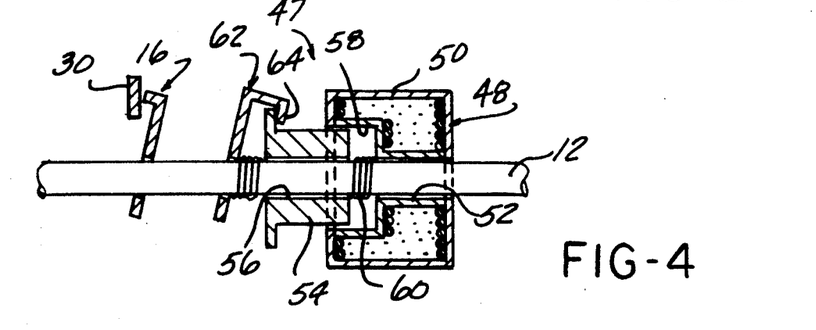
FIG. 4 is a front, cross sectional view of another embodiment of the linear motor shown in FIG. 1.

As shown in FIGS. 1 and 3, the solenoid 32 is mounted alongside of the output member 12 such that the plunger 38 is disposed in parallel with the output member 12. Another arrangement is shown in FIG. 4 in which the core 50 of a solenoid 48 is mounted coaxially about the output member 12. The output member 12 is slidable through a bore 52 formed in the core 50. The plunger 54 of the solenoid 48 also includes a central bore 56 through which the output member 12 slides. The plunger 54 is slidable into and out of an internal bore 58 formed in the core 50 and is biased to the outward, first position by a biasing means or spring 60. Otherwise, the operation of the linear motor shown in FIG. 4 is identical to that described above for the linear motor 10 shown in FIG. 1. The linear motor 47 shown in FIG. 4 also includes a first latch 62 which operates in the same manner as the first latch means 14 described above. A finger 64 extends outward from the short leg of the first latch means 62 to engage the plunger 54. This engagement causes the first latch means 62 to pivot to the second position shown in FIG. 4 in which the first latch means 62 is fixedly engaged with the output member 12 as well as to advance the fixedly engaged first latch means 62 and the output member 12 in an incremental advance movement coincident with movement of the plunger 54 to the second position, as described above.

Figure 7:
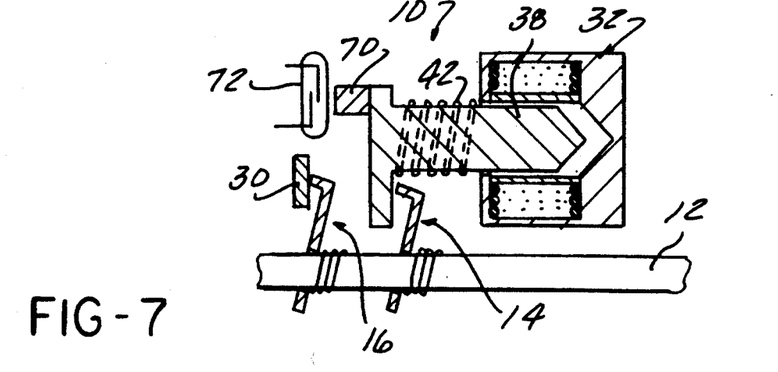
FIG. 7 is a front, cross sectional view showing another embodiment of the linear motor employing self-switching features.
Figure 8:
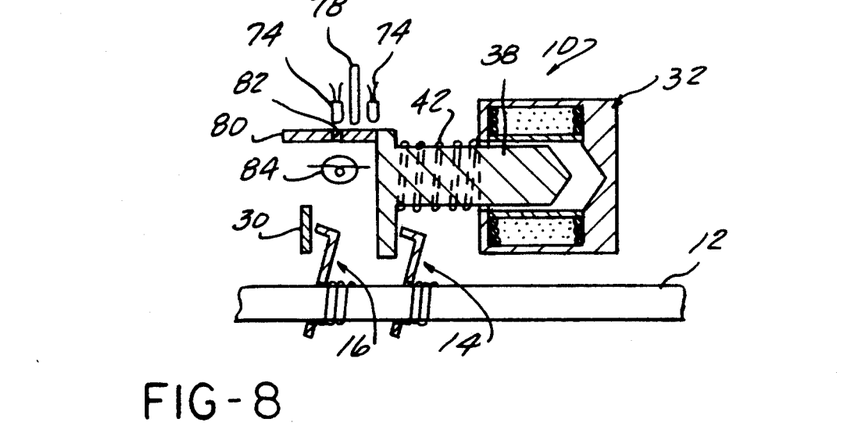
FIG. 8 is a front, cross sectional view, similar to FIG. 7, but showing another embodiment of a self-switching arrangement.

The application and disconnection of electrical current to and from the coil 36 of the solenoid 32 or 47, as described above, may be under the control of an external control device, not shown. As shown in FIGS. 7 and 8, which depict separate embodiments of the present invention, the linear motor 10 shown schematically therein may be "self-starting".

In FIG. 7, a permanent magnet 70 is mounted on and extends outward from one end of the plunger 38. A sensor, such as a magnetic reed switch 72, is positioned, via suitable mounting to a surrounding housing or support surface, not shown, to detect the presence of the permanent magnet 70 when the plunger 38 is in the first, extended position, as shown in FIG. 7. The proximity of the permanent magnet 70 is detected by the switch 72 which generates an output signal to a suitable control device, not shown, which supplies the flow of electric current to the coil of the solenoid 32 thereby activating the solenoid 32 and causing the advance of the plunger 38 and the incremental advance movement of the output member 12 as described above. The signal from the switch 72 will be discontinued when the permanent magnet 70 and the plunger 38 have moved a predetermined distance away from the switch 72, which distance is coincident with the full distance of travel of the plunger 38 to the second position within the core of the solenoid 32. This causes the electric current to be discontinued from the coil of the solenoid 32 thereby deactivating the solenoid 32. The biasing spring 42 will then bias the plunger 38 to the first position at which time the switch 72 will again detect the proximity of the permanent magnet 70 to repeat the operation of the linear motor 10.

The embodiment shown in FIG. 8 operates in a similar fashion except that the sensor is formed of at least one and preferably two photodetectors 74 and 76. The photosensors 74 and 76 are separated by a light shield 78. A solid member 80 is mounted on and extends outward from one end of the plunger 38. An aperture 82 is formed in the solid member 80.

As shown in FIG. 8, when the plunger 38 is in the first, extended position, the aperture 82 will be disposed adjacent to the first photosensor 74 such that the first photosensor 74 will receive light from a suitable light source 84 through the aperture 82 and generate an output signal which can be employed by an external control device to initiate the flow of electric current to the coil of the solenoid 32. When the plunger 38 has moved to the fully advanced, second position, light from the light source 84 will pass through the aperture 82 which is then located adjacent to the second photosensor 76 thereby generating an output signal from the second sensor 76 which can be employed to shut off the supply of electric current to the coil of the solenoid 32 and cause an extension of the plunger 38 via the spring 42 as described above.

Figure 5:
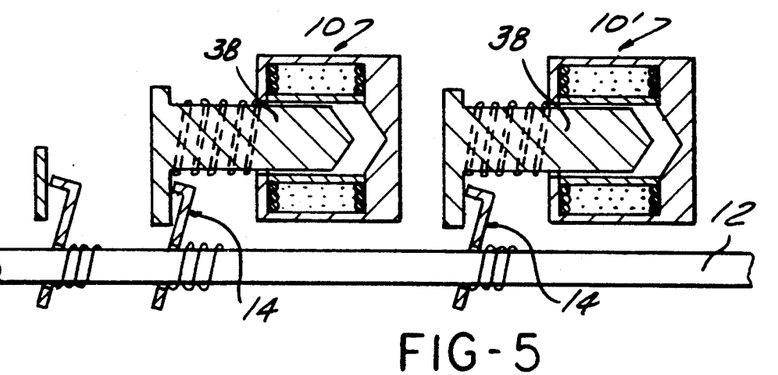
FIG. 5 is a front, cross sectional view showing another embodiment of the linear motor of the present invention.

Multiple linear motors, such as the two linear motors 10 and 10' shown in FIG. 5 may be co-linearly arranged with respect to a common output member 12 and operated in a phase spaced manner for a near continuous incremental advance of the output member 12. As shown in FIG. 5, first and second latches 14 and 16, respectively, are associated with the first linear motor 10. Only a single first latch means 14 is associated with and coupled to the plunger 38 of the second linear motor 10'. The single second latch means 16 is sufficient to hold the output member 12 in each incremental advance position during a resetting of each of the linear motors 10 and 10'.

The two linear motors 10 and 10' operate in the same manner to pivot or move the associated first latch means 14 to a second position into fixed engagement with the output member 12 and to advance the fixedly engaged first latch means 14 and the output member 12 forward a single incremental advance distance. The linear motors 10 and 10' may be sequentially energized by an external control device, not shown, such that the output member 12 is moved forward one incremental advance distance by the first linear motor 10, while the second linear motor 10' is being reset for its next sequential operation.

Figure 6:
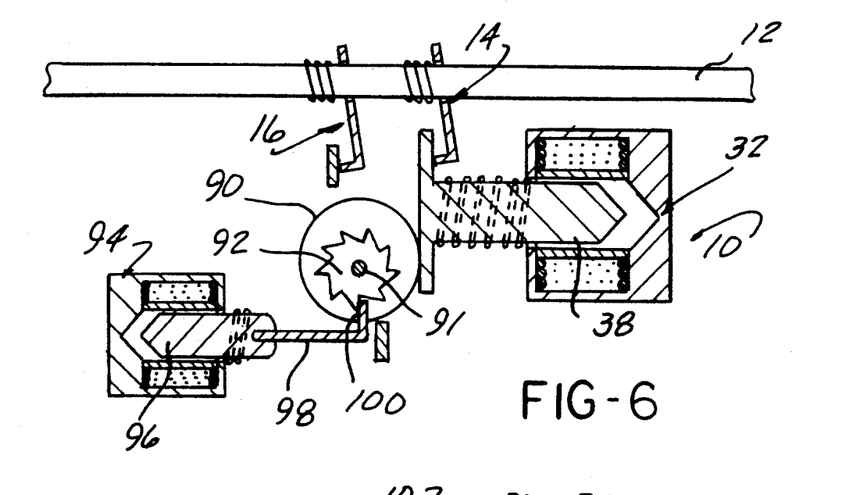
FIG. 6 is a front, cross sectional view of yet another embodiment of the linear motor of the present invention.

FIG. 6 depicts an alternate embodiment of the present invention in which the incremental advance distance of movement of the output member 12 may be selectively varied. In this embodiment, the linear motor 10 and first and second latch means 14 and 16, respectively, are operably coupled to the output member 12 as described above and shown in FIG. 1. A plunger return stop 90 is eccentrically mounted about a shaft or pivot. A ratchet gear 92 having a plurality of angularly formed teeth is mounted to the pivot shaft 91. The eccentrically mounted plunger return stop 90 defines a stop for the plunger 38 of the linear motor 10. That is, the eccentrically mounted plunger return stop 90 controls the distance of extension of the plunger 38 from the core of the linear motor 10 and, conversely, the amount of forward travel of the plunger 38 when electric current is supplied to the solenoid of the linear motor 10. The position of the plunger return stop 90 is controlled by an additional solenoid 94 having a movable plunger 96 mounted therein. A pawl 98 is attached to the plunger 96 and includes an angular end portion 100 which is configured to engage the teeth on the ratchet gear 92. Successive energizations of the solenoid 94 will cause the pawl 98 to engage successive teeth on the ratchet gear 92 thereby resulting in rotation of the eccentric plunger return stop 90 to the desired position and selectively vary the amount of the plunger return stop 90 located between the shaft 91 and the plunger 38. In this manner, the amount of return or extension of the plunger 38 to the first extended position can be selectively controlled so as to vary the amount of incremental advance of the output member 12.

Figure 9:
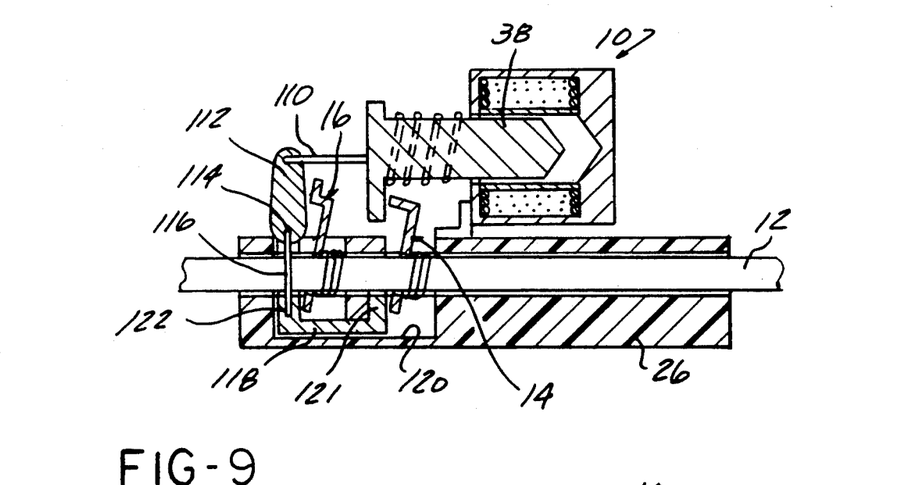
FIG. 9 is a front, cross sectional view showing another embodiment of the linear motor with unlatch features.
Figure 10:
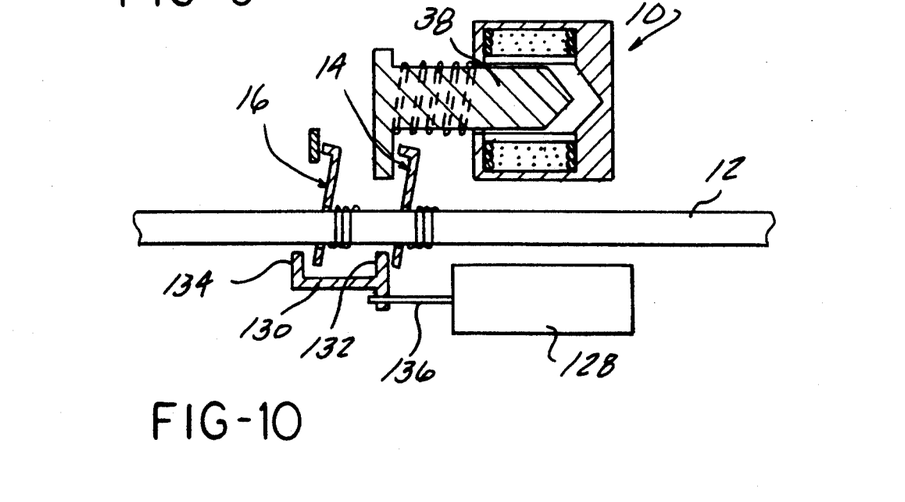
FIG. 10 is a front, cross sectional view of yet another embodiment of the linear motor showing a different unlatch arrangement.

The unique linear motor 10 of the present invention may also include unlatching means for unlatching at least the second latch means 16, as shown in several different embodiments depicted in FIGS. 9 and 10. In FIG. 9, the linear motor 10 is constructed identically to that described above and shown in greater detail in FIG. 1. A latch release rod 110 is connected to and extends outward from the external end of the plunger 38. The latch release rod 110 is connected at an opposite end to a pivotal rocker 112. The rocker 112 is mounted for pivotal movement about a pivot pin 114 which may be mounted to the housing 26 surrounding the output member 12. A connector rod 116 extends between the rocker 112 and a latch release member or fork 118 which is movably mounted in a recess 120 formed in the housing 26. The latch release member or fork 118 includes two upstanding shoulders 121 and 122 which are adapted to respectively engage one end of the first and second latch means 14 and 16 upon sliding linear movement of the latch release member 118.

In operation, extension of the plunger 38 to the first extended position when electric current is discontinued from the coil of the solenoid of the linear motor 10, will cause the latch release rod 110 to pivot the rocker 112 in a counterclockwise direction about the pivot pin 114. This will result in a sliding movement of the latch release member 118 to the right as viewed in FIG. 9 and cause an engagement of the shoulders 121 and 122 on the latch release member 118 with one end of the first and second latch means 14 and 16, respectively, thereby pivoting the first and second latch means 14 and 16 to the first position in which the output member 12 is freely movable in either direction through the first and second latch means 14 and 16. This enables the output member 12 to be retracted in a direction opposite from the incremental advance direction, or to the left in the orientation shown in FIG. 9, to a home or start position. Energization of the solenoid of the linear motor 10 and an advance of the plunger 38, as described above, will cause a reverse pivotal movement of the rocker 112 thereby urging the latch release member 118 to the left, as viewed in FIG. 9, and disengaging the shoulders 121 and 122 from the first and second latch means 14 and 16, respectively. This enables the biasing means associated with each of the first and second latch means 14 and 16 to pivot the associated latch means into fixed engagement with the output member 12 as described above and shown in FIG. 1.

FIG. 10 depicts a similar unlatching arrangement except that an independent latch release drive means 128 is employed to control the movement of a latch release member 130. The latch release member 130 is constructed substantially identical to the latch release member 118 shown in FIG. 9 and includes first and second spaced shoulders 132 and 134 which respectively engage one end of the first and second latch means 14 and 16. A rod 136 is connected to the latch release member 130 and is reciprocally driven by the latch release driver 128 which may be in the form of a solenoid, motor, etc. In this manner, the latch release drive means 128 causes movement of the first and second latch means 14 and 16 to the unlatch position at any time, but preferably only when the plunger 38 of the linear motor 10 is in the first, extended position with electric current disconnected from the linear motor 10.

It will be understood that in each of the embodiments of the linear motor shown in FIGS. 9 and 10, the unlatch means may be coupled to only the second latch means 16 to effect unlatching of the second latch means 16. Reverse movement of the output member 12 is still possible since the movement of the first latch means between engaged and disengaged positions with respect to the output member 12 is controlled by a combination of the forces of the associated biasing spring 24 and the plunger 38 of the solenoid of the linear motor 10.

Figure 11:
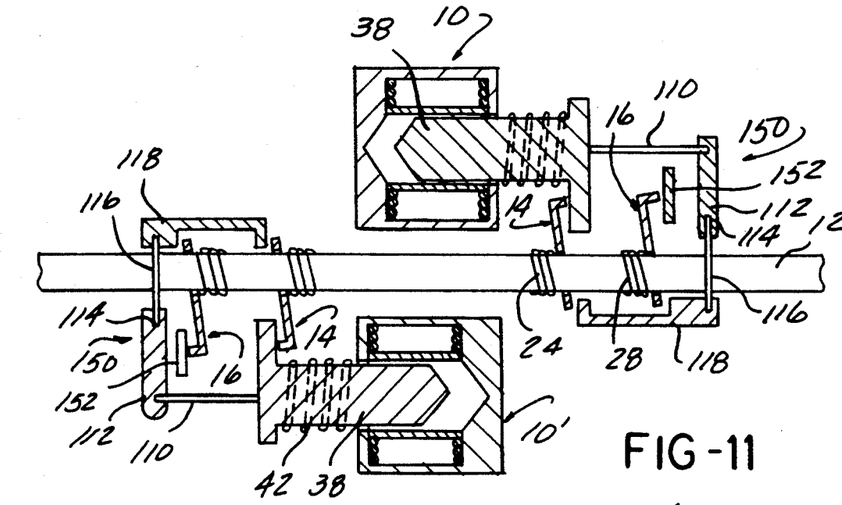
FIG. 11 is a front, cross sectional view showing another embodiment of the present invention in which two linear motor are arranged for bi-directional movement of the output member.
Figure 12:
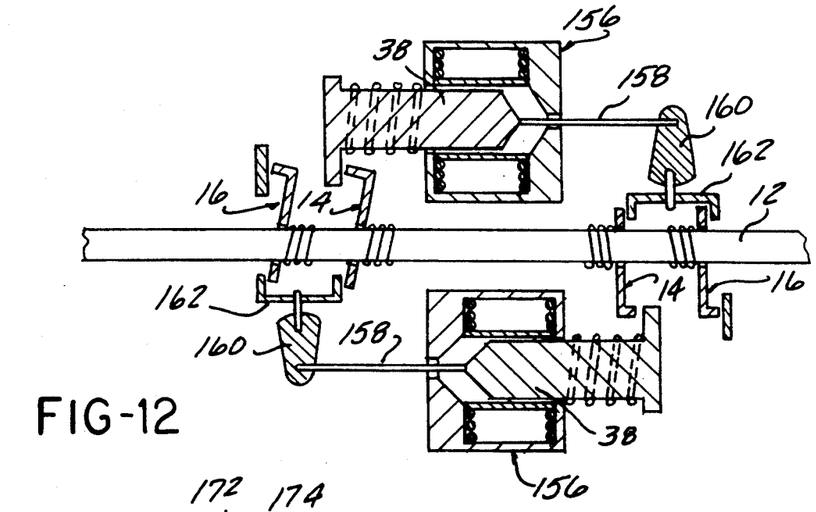
FIG. 12 is a front, cross sectional view of the present invention, similar to FIG. 11, but showing another embodiment in which two linear motors are arranged for bi-directional movement of the output member.

As shown in FIGS. 11 and 12, two linear motors may be paired together for bi-directional incremental movement of the output member 12. As depicted in FIG. 11, two identical linear motors 10 and 10' are coupled to the output member 12 via first and second latch means 14 and 16. An unlatch mechanism denoted in general by reference number 150 and substantially identical to that described above and shown in FIG. 9 is connected between each of the plungers 38 of the linear motors 10 and 10' and the first and second latch means 14 and 16 associated with each of the linear motors 10 and 10'. As described above, the unlatch mechanism 150 includes a latch release rod 110 connected between the plunger 38 and a pivotal latch release rocker 112. The latch release rocker member 112 is pivotal about a pivot pin 114. A connector rod 116 connects the latch release rocker member 112 with a latch release fork 118. The latch release fork 118 includes two shoulders which act on one end of the first and second latch means 14 and 16 as described above for the embodiment shown in FIG. 9.

The linear motor 10' is operably coupled to the output member 12 to provide for incremental advance of the output member 12 in one direction, i.e., to the right in the orientation shown in FIG. 11, upon each sequential energization of the coil of the linear motor 10'. Upon de-energization of the coil, the plunger 38 will be extended to its first position via the biasing spring 42 and, through the unlatch means 150, result in a pivotal movement of the first and second latches 14 and 16 associated with the linear motor 10' to a position which enables free, reverse movement of the output member 12 in a direction opposite from the incremental advance direction.

Conversely, the linear motor 10 is coupled to the output member 12 to provide for incremental advance of the output member 12 in a direction opposite from the incremental advance direction of movement of the output member 12 provided by the opposite linear motor 10'. Thus, since the first and second latches 14 and 16 associated with the linear motor 10 are disposed in a position which enables free movement of the output member 12 when electrical current is disconnected from the coil of the linear motor 10', the linear motor 10 is free to incrementally advance the output member 12 in an opposite direction, i.e., to the left in the orientation shown in FIG. 11, upon each sequential energization of the linear motor 10. When the plunger 38 of the linear motor 10 is extended to its first position after electric current is discontinued to the linear motor 10, the unlatch means 150 associated with the linear motor 10 will act on the first and second latches 14 and 16 and moves the latch means 14 and 16 to a position also enabling free movement of the output member 12. This enables the opposed linear motor 10' to incrementally advance the output member 12 when energized.

It should also be noted that the second latch means 16 for each of the linear motors 10 and 10' shown in FIG. 11 acts on a latch stop 152 which is secured to a suitable support structure or housing, not shown, employed to mount the linear motors 10 and 10' about the output member 12.

In FIG. 12, two linear motors 156 and 156' are coupled in parallel and act on the output member 12 for bi-directional, incremental advance movement of the output member 12 in opposite directions, depending upon which of the linear motors 156 and 156' is energized. However, in this embodiment, the output member 12 is locked in a fixed position when electric current is discontinued to either of the coils of the linear motors 156 and 156'.

In this embodiment, the linear motors 156 and 156' are identically constructed and are substantially the same as the linear motor 10 described above except that a latch release rod 158 extends outward from the plunger 38 of each of the linear motors 156 and 156' through the core into engagement with a latch release rocker member 160. A latch release fork 162 having two outwardly extending flanges is fixedly connected to each latch release rocker 160 which pivots about an end opposite from the point of connection of the latch release rod 158 to the latch release rocker 160. The flanges on the latch release fork 162 engage the respective first and second latch means 14 and 16, respectively, associated with each of the linear motors 156 and 156'.

As shown in FIG. 12, the plunger 38 of the first linear motor 156 through the rod 158, the rocket 160 and the latch release fork 162 acts on the first latch means 14 associated with the second linear motor 156'. Similarly, the plunger 38 of the second linear motor 156' acts on the first latch means 14 associated with the first linear motor 156. Thus, the first movement of the plunger of one of the linear motors, such as the plunger 38 of the first linear motor 156, acts on the first and second latch means 14 and 16 associated with the second linear motor 156' and moves such first and second latch means 14 and 16 to a position in which such latch means are disengaged from the output member 12 thereby allowing free movement of the output member 12. At the same time, the movement of the plunger 38 of the first linear motor 156 causes the plunger 38 to engage and pivot the first latch means 14 associated therewith into fixed engagement with the output member 12 so as to provide incremental advance of the output member 12 in a first direction. The opposite linear motor 156' operates in a similar, but opposite manner to first release the latches associated with the first linear motor 156 and, at the same time, cause engagement of the first latch means 14 associate therewith with the output member 12 to enable incremental advance movement of the output member 12 in an opposite direction.

Figure 13:
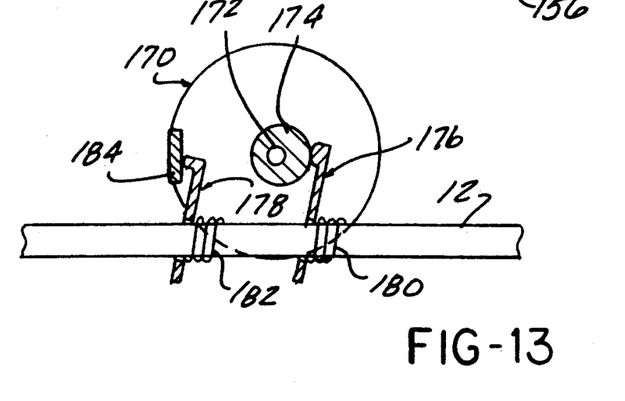
FIG. 13 is a front, cross sectional view of another embodiment of the linear motor of the present invention.

Another embodiment of the linear motor of the present invention is shown in FIG. 13 in which the linear motor 170 is constructed to provide rotary output movement which is translated into incremental advance movement of the output member 12. As shown in FIG. 13, a conventional electric motor, either AC or DC, has a rotatable output shaft 172 extending outward therefrom. An eccentric cam 174 is mounted on the output shaft 172 and engages one end of a first latch means 176. The first latch means 176 is identically constructed as the first latch means 14 shown in FIG. 1 and described above. Each cycle of rotation of the output shaft 172 of the motor 170 will bring the eccentric cam 174 into and out of engagement with the first latch means 176. During each cyclic engagement, the first latch means 176 is pivoted into fixed engagement with the output member 12 overcoming the bias of a biasing spring 180 and resulting in incremental advance movement of the output member 12 during the time that the eccentric cam 174 pivots the first latch 14 into fixed engagement with the output member 12. One end of the first latch means 176 follows the peripheral surface of the eccentric cam 174 during cyclic rotation of the cam 174 and automatically moves to a second position via the biasing spring 180 in which the output member 12 is disengaged from the first latch means 176.

A second latch means 178, identically constructed as the second latch means 16 shown in FIG. 1 and described above, is coupled to the output member 12 and acts on a fixed stop 184 which, in conjunction with a biasing means or spring 182 holds the second latch means 178 in fixed engagement with the output member 12 thereby permitting incremental advance movement of the output member 12 in one direction, but preventing reverse movement of the output member 12 when the first latch means 176 is pivoted to its freely movable position with respect to the output member 12.

Figure 14:
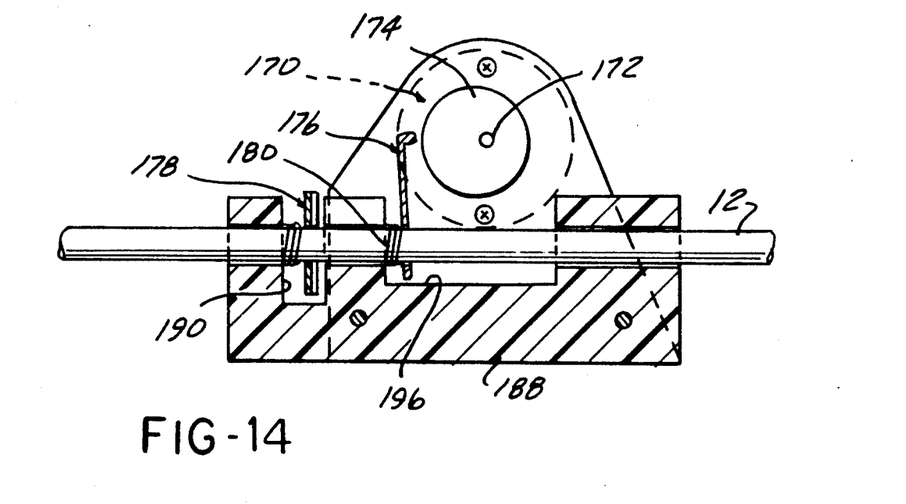
FIG. 14 is a front, partially cross sectioned view of another embodiment of the linear motor of the present invention.
Figure 15:
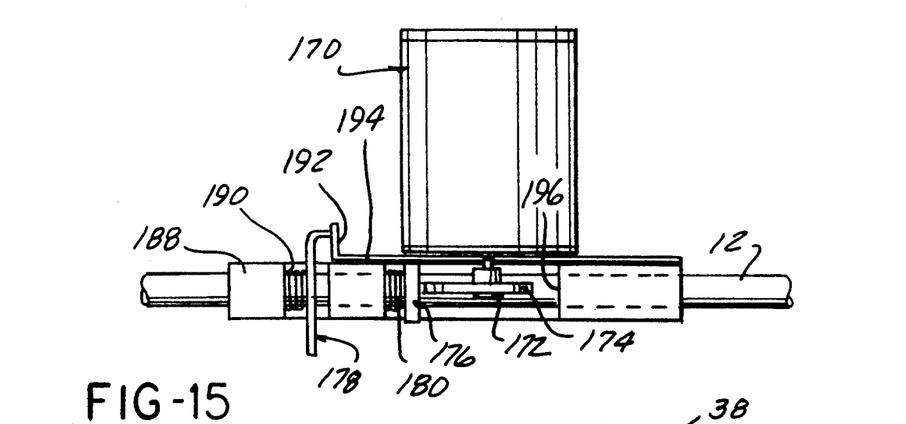
FIG. 15 is a plan view of the linear motor shown in FIG. 14.

Another embodiment of a rotary operated linear motor is shown in FIGS. 14 and 15. This embodiment is substantially the same as that shown in FIG. 13 and includes the electric motor 170 fixedly mounted to a housing 188. The second latch means 178 is pivotally mounted in a slot 190 formed in the housing 188. One end of the second latch means 178 acts on a flange 192 of a face plate 194 fixedly mounted to the motor 170.

The first latch means 176 is mounted in a second slot 196 in the housing 188 and is biased between the eccentric cam 174 mounted on the output shaft 172 of the motor 170 and a biasing spring 180 mounted about the output member 12. As shown in FIGS. 14 and 15, the output member 12 slidably extends through the housing 188. Otherwise, the operation of the linear motor shown in FIGS. 14 and 15 is identical to that described above with reference to the linear motor shown in FIG. 13.

Figure 16:
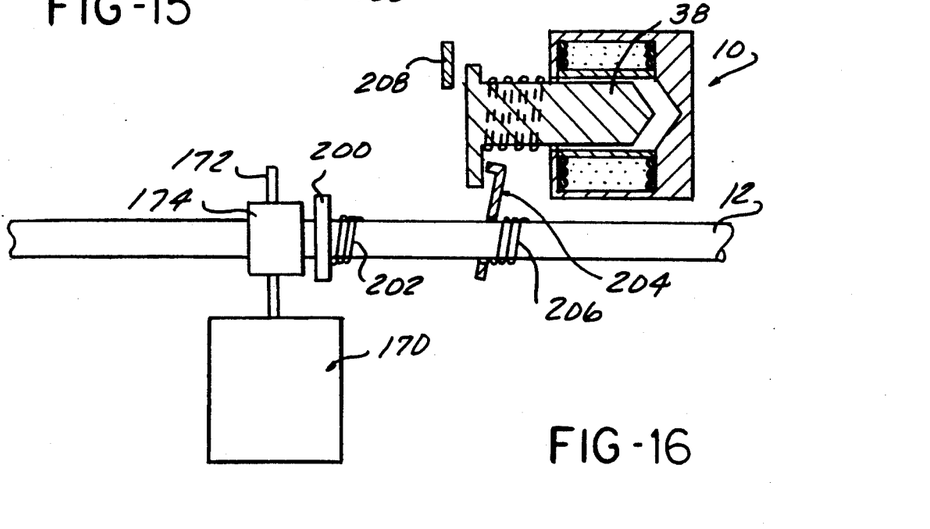
FIG. 16 is a front, partially cross sectioned view of another embodiment of the present invention showing a paired solenoid and motor.

In another embodiment shown in FIG. 16, the rotary motor 170 may be coupled with a linear motor 10 including an electromagnetic solenoid to provide two different modes of incremental advance movement of the output member 12. As shown in FIG. 16, the linear motor 170 includes an output shaft 172 on which an eccentric cam 174 is fixedly mounted. The cam 174 engages a first latch means 200 which is biased toward a freely movable position with respect to the output member 12 by biasing means 202, such as a coil spring. The linear motor 170 operates in the same manner as that described above for the embodiment shown in FIGS. 13-15 in that cyclic rotation of the cam 174 will move the first latch means 200 associated therewith into and out of engagement with the output member 12 to cause a single incremental advance movement of the output member 12 during each cycle of rotation of the output shaft 172 of the motor 170.

At the same time, the plunger 38 of the linear motor 10 is operably coupled to the output member 12 by its own latch means 204. The latch means 204 is identically constructed as the latch means 14 described above and shown in FIG. 1 and is pivotal to a freely movably position with respect to the output member 12 by a biasing means 206, such as a coil spring mounted about the output member 12. The plunger 38 acts on one end of the latch means 204 and causes the latch means 204 to pivot into fixed engagement with the output member 12 during each advance of the plunger 38 which results in an incremental advance movement of the output member 12. A plunger stop 208 limits the extension of the plunger 38 from the core of the linear motor 10 and defines the first, extended position of the plunger 38. In this position, the latch means 204 is pivoted by the biasing spring 206 to its freely movable position with respect to the output member 12 thereby enabling the output member 12 to be incrementally advanced by energization of the motor 170.

The embodiment shown in FIG. 16 is ideally suited for dual control of the incremental advance of the output member 12. Since the motor 170 can be operated at high rotational speeds, high amounts of successive incremental advance movements of the output member 12 may be achieved by continuously energizing the motor 170 for a predetermined amount of time. The linear motor 10 employing the reciprocal plunger 38 may be utilized for fine incremental advance movement of the output member 12 after the motor 170 has been de-energized.

In summary, there has been disclosed a unique linear motor which provides incremental advance movement of an output member in one or two directions in which the output member may have any desired length and, particularly, a long length for specific applications. The linear motor which drives the output member remains in a fixed position and is therefore relatively small in size thereby reducing the weight and the overall cost of the linear motor. The linear motor may also be configured in different embodiments, i.e., with unlatch means, in pairs for bidirectional incremental advance movement, and in a rotary embodiment for high speed incremental advance of the output member.

What is claimed is:

1. A linear motor comprising:
   a linearly movable output member;
   an electromagnetic solenoid formed of a core and a coil, a plunger movably disposed within the core and movable from a first extended position with respect to the core and a second position in which the plunger is drawn into the core by magnetic attraction with the core when electric current is applied to the coil, the plunger being movable a predetermined distance from the first to the second position;
   means for moving the plunger to the first extended position;
   means, responsive to movement of the plunger from the first to the second position, for engaging and advancing the output member a distance substantially equal to the predetermined distance of movement of the plunger, the engaging and advancing means including:
      first unidirectional latch means coupled to the output member and movable between a first position freely movable with respect to the output member and a second position in which the first latch means is fixedly engaged with the output member; and
      means for normally biasing the first unidirectional latch means to the first position;
      the plunger being engageable with the first latch means and overcoming the force of the biasing means for moving the first latch means to the second position into fixed engagement with the output member when the plunger moves from the first to the second positions to advance the first latch means and the output member fixedly connected thereto a distance substantially equal to the predetermined distance of movement of the plunger;
   means, coupled to the output member, for retaining the output member in an incremental advance position while the plunger is moving from the second to the first positions, the retaining means including:
      second unidirectional latch means coupled to the output member and movable between a first position freely movable with respect to the output member and a second position fixedly engaged with the output member;
      a stop fixedly mounted on the linear motor; and
      biasing means for urging the second latch means to a second position into engagement with the stop to prevent the output member from moving in a direction opposite from the incremental advance direction of movement of the output member; and
   a selectively energizable unlatch member movably engaged with at least the second latch means for moving at least the second latch means to the first position, when activated, to allow movement of the output member in a direction opposite from the incremental advance direction of movement of the output member.

2. The linear motor of claim 1 wherein the output member is a rigid tubular member.

3. The linear motor of claim 1 wherein the output member is a flexible cable.

4. The linear motor of claim 1 wherein the plunger moving means comprises:
   biasing means, acting on the plunger, for normally biasing the plunger to the first extended position.

5. The linear motor of claim 1 wherein the first and second latch means each comprise:
   a planar member having opposed first and second ends and a through bore extending therethrough, the through bore slidably receiving the output member therethrough in a loose fit such that the planar member is pivotal about the output member under force exerted on either of the first and second ends thereof.

6. The linear motor of claim 5 wherein:
   the first and second planar members of the first and second latch means, respectively, are spaced co-linearly along the output member.

7. A linear motor comprising:
   a linearly movable output member;
   an electromagnetic solenoid formed of a core and a coil, a plunger movably disposed within the core and movable from a first extended position with respect to the core and a second position in which the plunger is drawn into the core by magnetic attraction with the core when electric current is applied to the coil, the plunger being movable a predetermined distance from the first to the second position;
   means for moving the plunger to the first extended position;
   means, responsive to movement of the plunger from the first to the second position, for engaging and advancing the output member a distance substantially equal to the predetermined distance of movement of the plunger, the engaging and advancing means including:
      first unidirectional latch means coupled to the output member and movable between a first position freely movable with respect to the output member and a second position in which the first latch means is fixedly engaged with the output member; and means for normally biasing the first unidirectional latch means to the first position;

the plunger being engageable with the first latch means and overcoming the force of the biasing means for moving the first latch means to the second position into fixed engagement with the output member when the plunger moves from the first to the second positions to advance the first latch means and the output member fixedly connected thereto a distance substantially equal to the predetermined distance of movement of the plunger;

means, coupled to the output member, for retaining the output member in an incremental advance position while the plunger is moving from the second to the first positions, the retaining means including:

second unidirectional latch means coupled to the output member and movable between a first position freely movable with respect to the output member and a second position fixedly engaged with the output member;

a stop fixedly mounted on the linear motor; and biasing means for urging the second latch means to a second position into engagement with the stop to prevent the output member from moving in a direction opposite from the incremental advance direction of movement of the output member; and a selectively energizable unlatch member movably engaged with at least the second latch means for moving at least the second latch means to the first position, when activated, to allow movement of the output member in a direction opposite from the incremental advance direction of movement of the output member; and a rocker member having first and second ends;

the first end being connected to and movable with the plunger;

the second end of the rocker member being connected to the unlatch member for moving the unlatch member to a position in which the unlatch member engages at least the second latch means for unlatching at least the second latch means from the output member.

8. A linear motor comprising:

a linearly movable output member;

an electromagnetic solenoid formed of a core and a coil, a plunger movably disposed within the core and movable from a first extended position with respect to the core and a second position in which the plunger is drawn into the core by magnetic attraction with the core when electric current is applied to the coil, the plunger being movable a predetermined distance from the first to the second position;

the output member extending co-axially through the core, coil and plunger of the solenoid;

means for moving the plunger to the first extended position;

means, responsive to movement of the plunger from the first to the second position, for engaging and advancing the output member a distance substantially equal to the predetermined distance of movement of the plunger, the engaging and advancing means including:

first unidirectional latch means coupled to the output member and movable between a first position freely movable with respect to the output member and a second position in which the first latch means is fixedly engaged with the output member; and means for normally biasing the first unidirectional latch means to the first position;

the plunger being engageable with the first latch means and overcoming the force of the biasing means for moving the first latch means to the second position into fixed engagement with the output member when the plunger moves from the first to the second positions to advance the first latch means and the output member fixedly connected thereto a distance substantially equal to the predetermined distance of movement of the plunger;

means, coupled to the output member, for retaining the output member in an incremental advance position while the plunger is moving from the second to the first positions, the retaining means including:

second unidirectional latch means coupled to the output member and movable between a first position freely movable with respect to the output member and a second position fixedly engaged with the output member;

a stop fixedly mounted on the linear motor; and biasing means for urging the second latch means to a second position into engagement with the stop to prevent the output member from moving in a direction opposite from the incremental advance direction of movement of the output member; and a selectively energizable unlatch member movably engaged with at least the second latch means for moving at least the second latch means to the first position, when activated, to allow movement of the output member in a direction opposite from the incremental advance direction of movement of the output member.

9. A linear motor comprising:

a linearly movable output member;

an electromagnetic solenoid formed of a core and a coil, a plunger movably disposed within the core and movable from a first extended position with respect to the core and a second position in which the plunger is drawn into the core by magnetic attraction with the core when electric current is applied to the coil, the plunger being movable a predetermined distance from the first to the second position;

means for moving the plunger to the first extended position;

means for varying the amount of advance movement of the plunger, the means for varying the amount of advance movement of the plunger including:

a rotatable, eccentric cam;

a ratchet mounted on the cam and having a plurality of teeth;

a pawl engageable with the teeth for one-way rotation of the eccentric cam; and means for reciprocating the pawl a predetermined number of times to cause a predetermined amount of rotation of the cam;

the cam being engageable with the plunger when the plunger is in the first, extended position to limit the amount of movement of the plunger to the first, extended position;

means, responsive to movement of the plunger from the first to the second position, for engaging and advancing the output member a distance substantially equal to the predetermined distance of movement of the plunger; and means, coupled to the output member, for retaining the output member in an incremental advance position while the plunger is moving from the second to the first positions.

10. The linear motor of claim 1 further comprising:

a second electromagnetic solenoid including a core and a coil, a second plunger movably disposed within the core and movable from a first extended position with respect to the core to a second position in which the plunger is magnetically drawn into the core by magnetic attraction when electric current is applied to the coil;

second means for moving the output member upon each successive energization of the second solenoid, the second means being co-axially arranged with the other solenoid on the output member; and the solenoids being separately energized to independently incrementally advance the output member in a first direction.

11. The linear motor of claim 1 further comprising:

a second electromagnetic solenoid including a core and a coil and a second plunger movably disposed with respect to the core;

another pair of first means for engaging the output member and another means for retaining the output member in an incremental advance position;

the second plunger being oriented opposite from the plunger of the other solenoid for movement in a direction opposite from the other plunger;

the retaining means associated with the other plunger being normally biased to a first position in which the output member is freely slidable therethrough when the other plunger is in the first position;

the second retaining means associated with the second plunger being normally biased into fixed engagement with the output member; and the solenoids being selectively energized to respectively advance the output member an incremental advance distance in opposite directions.

12. The linear motor of claim 1 further comprising:

first means for detecting the plunger in the first extended position, the first detecting means generating an output signal to initiate the flow of electrical current to the coil of the solenoid; and second means for detecting the plunger in the second position, the second detecting means generating an output signal to discontinue the flow of electrical current to the solenoid.

* * * * *